United States Patent [19]
Padture et al.

[11] Patent Number: 6,015,630
[45] Date of Patent: Jan. 18, 2000

[54] CERAMIC MATERIALS FOR THERMAL BARRIER COATINGS

[75] Inventors: Nitin P. Padture, Storrs; Maurice Gell, Newington; Paul G. Klemens, Mansfield, all of Conn.

[73] Assignee: The University of Connecticut, Storrs, Conn.

[21] Appl. No.: 08/835,411

[22] Filed: Apr. 10, 1997

[51] Int. Cl.[7] .................................................. B32B 15/04
[52] U.S. Cl. .................... 428/632; 428/469; 416/241 B
[58] Field of Search ................................. 428/632, 633, 428/469; 416/241 B

[56] References Cited

U.S. PATENT DOCUMENTS

| | | | |
|---|---|---|---|
| 3,939,003 | 2/1976 | McCauley et al. | 106/65 |
| 4,240,828 | 12/1980 | Huseby | 75/135 |
| 5,306,560 | 4/1994 | Wright et al. | 428/379 |
| 5,324,544 | 6/1994 | Spence et al. | 427/397.7 |
| 5,336,560 | 8/1994 | Spence et al. | 428/336 |
| 5,352,642 | 10/1994 | Pak et al. | 501/95 |
| 5,567,518 | 10/1996 | Pejryd et al. | 428/378 |
| 5,572,725 | 11/1996 | Morris et al. | 428/555 |
| 5,573,862 | 11/1996 | Gualtieri et al. | 428/688 |

*Primary Examiner*—John J. Zimmerman
*Attorney, Agent, or Firm*—Cantor Colburn LLP

[57] ABSTRACT

A method for identifying ceramics suitable for use as thermal barrier coatings is presented, based on parameters associated with thermal conductivity, oxygen diffusivity, thermal expansion coefficient, maximum temperature capability, hardness, elastic modulus, density, and chemical reactivity. A ceramic thermal barrier coating and method of manufacture is further presented, the ceramic comprising yttrium aluminum garnet ($Y_3Al_5O_{12}$, or YAG)-based ceramics. Such ceramics are based on yttrium aluminum garnet or other ceramics with the garnet structure and alloys thereof. The ceramics in accordance with the present invention have low thermal conductivity, and are more potentially durable than prior art zirconia based ceramics.

13 Claims, 3 Drawing Sheets

CERAMIC MATERIALS FOR THERMAL BARRIER COATINGS

BACKGROUND OF THE INVENTION

1. Field of the Invention

This invention relates generally to ceramic materials. More particularly, this invention relates to methods for identifying ceramic materials suitable for use as thermal barrier coatings, and novel ceramic materials discovered by such methods, comprising yttrium aluminum garnet or other ceramics with the garnet structure and alloys thereof. These ceramic materials exhibit low thermal conductivity, high thermal expansion, phase stability to high temperatures, and potentially improved durability.

2. Brief Description of the Prior Art

Thermal barrier coatings (TBCs) are important for the insulation and protection of combustors and turbine vanes used in gas-turbine engines, for example in jet aircraft and power generators. Plasma-sprayed TBCs provide metal temperature reductions of as much as 150° C. (300° F.). The introduction of TBCs deposited by electron beam physical vapor deposition processes over the past five years has provided a major improvement in the durability of prior art TBCs. However, to meet aggressive gas turbine engine performance goals for efficiency and durability, TBCs will be required on turbine airfoils and other hot section components. For the successful application of TBCs to these advanced gas turbine engines (which have turbine inlet temperatures of greater than 1425° C.), TBCs of greatly improve durability and performance will be required.

TBCs in production today comprise a ceramic-metal composite having a metal substrate, a metallic bond coat (on the order of 50–125 $\mu$m thick) disposed on the metal substrate, and a protective ceramic coating (on the order of 125–500 $\mu$m thick) disposed on the metallic bond coat. The metal substrate is commonly a superalloy, such as MAR-M509 René N5; PWA 1480, PWA 1484, and the like. The metallic bond coat commonly consists of a MCrAlY overlay coating or a platinum aluminide (PtAl) diffusion coating. During heat treatment and service, these metallic bond coats form a thin, alumina ($Al_2O_3$) film between the bond coat and the protective ceramic coating.

Presently, the protective ceramic coating is made of polycrystalline zirconia ($ZrO_2$)-based ceramics, including yttria-stabilized zirconia (YSZ) alloy ceramics. Unfortunately, zirconia-based ceramics fail prematurely by spallation during service, thereby exposing the underlying metal to hot gases. This failure is of particular concern in the context of future gas-turbine engines designed for higher operating temperatures and long lives. A number of factors contribute to TBC failure, one of the most important being oxidation of the metallic bond coat. The metallic bond coat is an oxidation-resistant bonding layer present between the metal substrate and the zirconia coating. Oxidation is due to the gas-turbine engine itself providing an environmental oxygen source. The oxygen is readily transported to the bond coat via microscopic defects, such as microcracks and pores, in the zirconia-based ceramic coating. Such defects are intentionally manufactured into the coatings, in order to improve thermal insulation by interrupting heat flow, and in order to relieve thermal-expansion-mismatch strain between the metal substrate and the ceramic coating.

Even where these defects are absent or non-percolating in nature, oxygen is nonetheless readily transported by diffusion through the zirconia lattice. The fast diffusion of oxygen is due to the high concentrations of oxygen vacancies present in the zirconia lattice. Notably, this high concentration of oxygen vacancies also contributes to the low thermal conductivity of zirconia. The usefulness of zirconia-based TBCs thus appears to be fundamentally limited. Accordingly, there remains a need for effective TBCs of high durability in oxygenated, very high temperature environments, and systematized methods for their discovery.

SUMMARY OF THE INVENTION

The above-discussed deficiencies and drawbacks of the prior art are overcome by the method of the present invention wherein candidate ceramic materials are systematically screened using the criteria of thermal conductivity, oxygen diffusivity, thermal expansion coefficient, maximum temperature capability, hardness, elastic modulus, density, and chemical reactivity. Novel thermal barrier coatings discovered in accordance with the present invention comprise yttrium aluminum garnet ($Y_3Al_5O_{12}$, or YAG)-based ceramics. YAG-based ceramics may comprise YAG, or other ceramics with the garnet structure, and alloys thereof. The alloying approach is particularly useful for tailoring the thermal conductivity of the ceramics. The ceramics in accordance with the present invention have excellent thermal resistivity, and are potentially more durable than prior art zirconia-based ceramics.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGURES.

DETAILED DESCRIPTION OF THE INVENTION

Figure 1A:
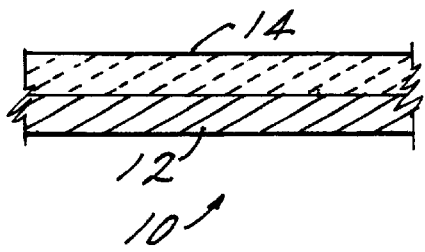
FIGS. 1A and 1B are cross-sectional elevational views of ceramic-metal composites in accordance with the present invention wherein the ceramic is a YAG-based ceramic.

The method of the present invention is a systematized procedure for the identification of novel ceramic oxides suitable for use as TBCs, and in particular, ceramic oxides potentially superior to the current zirconia-based TBCs. In accordance with the present method, certain critical chemical and physical properties are selected, and assigned parameters that are predicted to be characteristic of suitable TBC materials. In a preferred embodiment, these properties include thermal conductivity, oxygen diffusivity, and thermal expansion coefficient. In a particularly preferred embodiment, the properties further include maximum temperature capability, hardness, elastic modulus, density, and chemical reactivity.

The parameters assigned to each of these properties is selected so as to ensure that the candidate materials are either comparable or superior to current zirconia-based ceramics, particularly in the area of durability. Accordingly, in order to result in enhanced thermal insulation, the preferred parameter for thermal conductivity is less than or equal to about 2.7 $Wm^{-1}K^{-1}$ at 1000° C.

In order to retard oxidation of the bond coat or the superalloy substrate, oxygen diffusivity is preferably at least Literature or measured values for candidate ceramic oxides are then compared with the above-described parameters. Candidates that meet all or nearly all (for example, seven of the eight) listed parameters are selected for further study as TBCs. An example of use of this method to screen oxide ceramics is illustrated in Table 1 below. Table 1 lists sixteen known oxide ceramics, and the published physical and chemical data for each ceramic.

| Oxide Ceramics | Thermal Cond. @ 1127° C. (W/m/K) | $O_2$ Diffusivity @ 1000° C. ($m^2/s$) | Thermal Exp. Coef. @ 1000° C. ($\times 10^{-6}$/K) | Maximum Temp. Capability (°C.) | Hardness (GPa) | Elastic Modulus (GPa) | Density ($g/cm^3$) | Chemical Reactions with Environment and Solvents |
|---|---|---|---|---|---|---|---|---|
| $Al_2O_3$ Alumina | 5.5 | $10^{-19}$ | 9.5 | 2050 | 20 | 380 | 4.0 | Inert |
| $Al_6Si_4O_{15}$ Mullite | 4.2 | $10^{-21}$ | 6 | 1830 | 10 | 220 | 3.1 | |
| $Al_2TiO_3$ Al. Tit. | | | 11 | 1860 | 10 | 250 | 3.7 | Decomposes into $Al_2O_3$ and $TiO_2$ |
| $CeO_2$ Ceria | 2.5 | $10^{-10}$ | 12 | 2700 | | | 7.2 | |
| CoO Co. Oxide | | $10^{-19}$ | | | | | | |
| $LaPO_4$ Monazite | | | 9.6 | 2072 | 5.6 | 133 | 5.1 | Corrodes at high temp. in alkali |
| MgO Magnesia | 6.8 | $10^{-20}$ | 13.5 | 2620 | 7.5 | 290 | 3.5 | Corrodes at high temp. in $H_2O$ |
| $MgAl_2O_4$ Spinel | 4.9 | | 8.8 | 2135 | | 280 | 3.5 | Corrodes at high temp. in $H_2O$ |
| NiO | 3.8 | | 14.4 | | | | | |
| $Sc_2O_3$ Scandia | | | 8.5 | 2400 | | | | |
| $TiO_2$ Titania | 2.8 | $10^{-17}$ | 9 | 1850 | 11 | 300 | 4.2 | Inert |
| $Y_2O_3$ Yttria | 2.7 | $10^{-12}$ | 7.9 | 2400 | | 180 | 5.0 | Inert |
| $Y_3Al_3O_{12}$ (YAG) | 3.2 | $10^{-20}$ | 9.1 | 1970 | 17 | 280 | 4.5 | Inert |
| ZnO Zn. Oxide | 2.8 | | 10 | | | | 5.7 | |
| $ZrO_2$ Zirconia | 2.7 | $10^{-10}$ | 10 | 1425 | 14 | 250 | 6.4 | Inert |
| $ZrSiO_4$ Zircon | 3 | | 4.5 | | 6 | | 4.6 | Inert | five orders of magnitude less than that of zirconia, that is, less than or equal to about $10^{-15}$ $m^2s^{-1}$ at 1100° C.

In order to result in reduced thermal-expansion mismatch stresses between the ceramic coating and the metal substrate, the thermal expansion coefficient is preferably greater than or equal to about $9 \times 10^{-6°}$ $C.^{-1}$.

The maximum use temperature is preferably greater than or equal to about 1400° C., in order to be useful in advanced gas turbine engines.

The hardness is preferably greater than or equal to about 14 GPa in order to provide satisfactory erosion resistance.

In order to reduce elastic modulus mismatch and to enhance the strain tolerance of the ceramic, the elastic modulus is preferably less than or equal to about 250 GPa.

The density is preferably less than about 6.4 $gcm^{-3}$, in order to achieve reduced weight, which is especially useful in connection with materials used on rotating components.

Finally, the ceramic is preferably inert to common industrial solvents used in the manufacture and use of TBCs, as well as other environmental conditions commonly found in gas turbine engines.

Use of this method resulted in the identification of the YAG-based ceramics described in more detail below.

The ceramic coatings in accordance with the present invention comprises yttrium aluminum garnet ($Y_3Al_5O_{12}$, or YAG)-based ceramics. YAG-based ceramics may comprise YAG, or other ceramics with the garnet structure, and alloys thereof The ceramics in accordance with the present invention have excellent thermal resistivity, and are potentially more durable than prior art zirconia-based ceramics.

Figure 2:
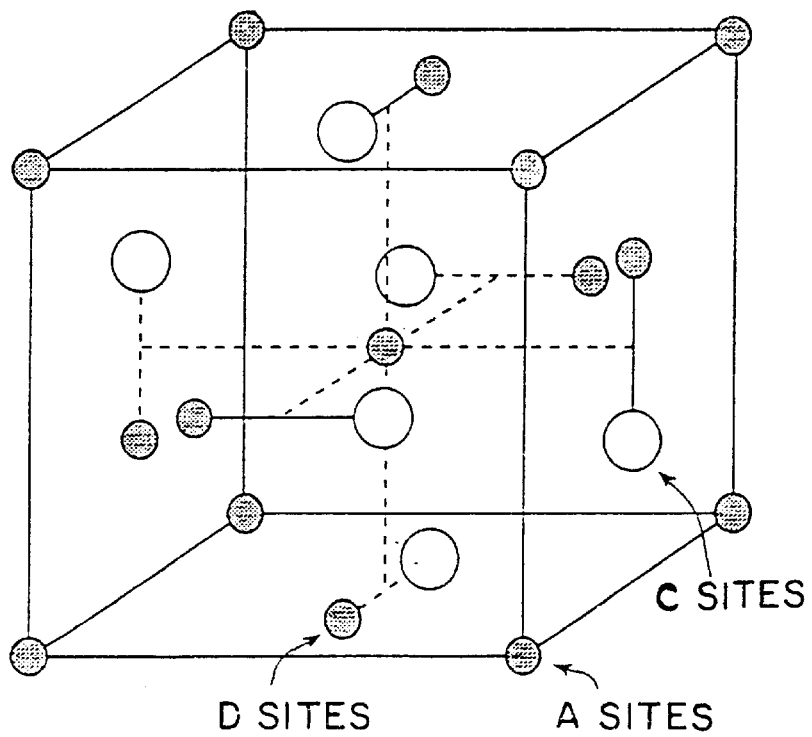
FIG. 2 is a schematic representation of the crystal structure of garnets showing the potential A, C, and D sites for substitution.
Figure 3:
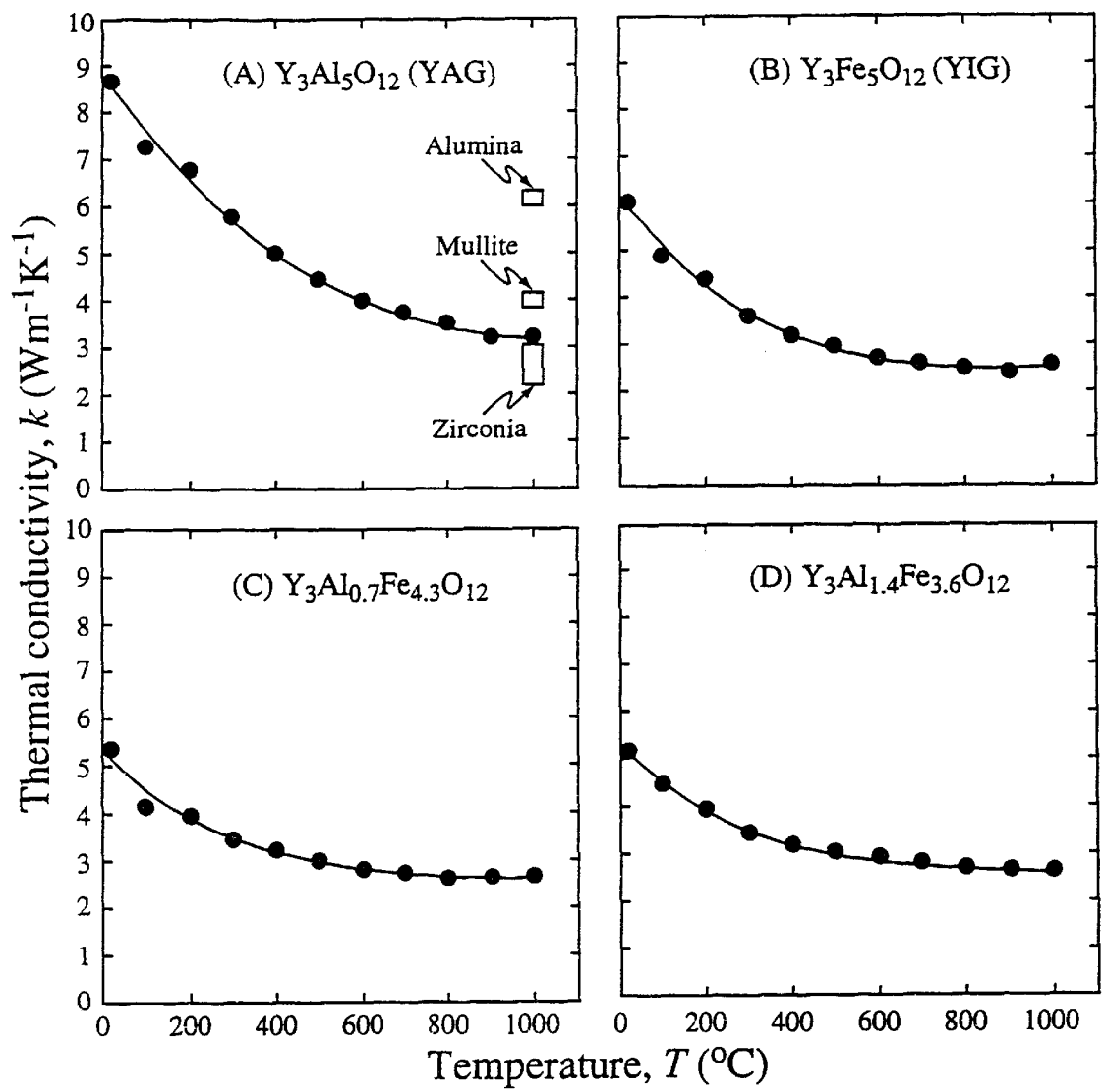
FIGS. 3A–D are plots showing the effect of temperature on thermal conductivity for ceramic materials in accordance with the present invention, including (A) YAG (thermal conductivities of dense, polycrystalline alumina, mullite, and zirconia at 1000° C. are indicated for comparative purposes); (B) YIG; (C) $Y_3Al_{0.7}Fe_{4.3}O_{12}$; and (C) $Y_3Al_{1.4}Fe_{3.6}O_{12}$.

YAG belongs to the isostructural garnet family of ceramics having the general formula $Y_3{}^CAl_2{}^AAl_3{}^DO_{12}$, where C, A, and D are special sites in the garnet crystal structure as shown in FIG. 2 (the oxygen sublattice has been omitted for clarity). The "A" site is octaherally coordinated with respect to oxygen, the "C" site is tetrahedrally coordinated with respect to oxygen, and the "D" site is dodecahedrally coordinated with respect to oxygen. In the case of YAG, all of the $Y^{3+}$ sites occupy the "C" sites. Two fifths of the $Al^+$ atoms occupy the "A" sites, and the remainder of the $Al^{1+}$ atoms occupy the "D" sites.

As used herein, "YAG-based ceramics" refers to a YAG ceramic itself, or a member of the garnet family of ceramics in which all or part of the $Al^{3+}$ on the A and/or D sites may be substituted by one or a mixture of other trivalent elements, such elements including, but not being limited to, iron, gallium, scandium, and the like. Substitution of all of the $Al^{3+}$ atoms by $Fe^{3+}$, for example, results in $Y_3Fe_5O_{12}$ (yttrium iron garnet, YIG). Thus, there is complete solid solubility between YAG and YIG, with a general formula $Y_3Al_{5-x}Fe_xO_{12}$, where x varies from 0 to 5.

Similarly, "YAG-based ceramics" in accordance with the present invention also refers to those garnets wherein the yttrium on the site C is replaced in part or in whole by a combination of rare earth elements including, but not being limited to, lanthanum, cerium, praseodymium, neodymium, samarium, europium, gadolinium, terbium, dysprosium, holomium, erbium, thulium, ytterbium, lutetium and the like.

As revealed by the above-described method for systematic identification of ceramics suitable for TBCs, YAG-based ceramics possess a number of desirable physical and mechanical characteristics. The thermal conductivity of YAG is 3.2 $Wm^{-1K-1}$ at 1000° C. This value is somewhat higher than that of zirconia. However in an important feature of the present invention, the thermal conductivity of YAG-based ceramics may be tailored by alloying YAG with other ceramics from the isostructural family of garnets. For example, a substitutional solid-solution alloy of YAG and yttrium iron garnet (YIG) ($Y_3Al_5O_{12}$—$Y_3Fe_5O_{12}$) has a thermal conductivity of 2.5 $Wm^{-1}K^{-1}$ at 1000° C. Where YAG-based ceramics are used, the thermal conductivity of the ceramic is preferably less than or equal to about 2.7 $Wm^{-1}K^{-1}$ at 1000° C. (the thermal conductivity of zirconia). These low conductivities result in improved TBC efficiencies, by allowing operation at higher temperature or saving on cooling air.

As discussed above, oxygen diffusivity is an important property for thermal barrier coatings. The oxygen diffusivity of YAG is $10^{-20}$ $m^2s^{-1}$ at 1100° C., which is ten orders of magnitude lower than that of zirconia. Where YAG-based ceramics are used, the oxygen diffusivity of the ceramic is preferably at least five orders of magnitude less than that of zirconia, that is, less than or equal to $10^{-15}$ $m^2s^{-1}$ at 1100° C. This lower level of diffusivity retards oxidation of the bond coat or the superalloy substrate.

Another parameter of interest is the coefficient of thermal expansion. Matching of coefficients of thermal expansion between the ceramic TBC and metal substrate is important to reduce thermal expansion mismatch stresses between the two layers. The thermal expansion coefficient of YAG is $9.1 \times 10^{-6°}$ $C.^{-1}$. Since the thermal expansion coefficient of zirconia is $9 \times 10^{-6°}$ $C.^{-1}$, the thermal expansion coefficient of YAG-based ceramics in accordance with the present invention is preferably less than or equal to about $9 \times 10^{-6°}$ $C.^{-1}$ In order to operate at the higher temperatures present in advanced gas-turbine engines, the maximum use temperature is preferably at least 100° C. greater than that of zirconia, that is, greater than or equal to about 1400° C. YAG is stable without any phase transformation from room temperature up to its congruent melting point of 1970° C.

High hardness is desirable for satisfactory erosion resistance. Since the hardness of zirconia is about 14 GPa, improved ceramic materials will have a hardness is preferably equal to or greater than about 14 GPa. The hardness of YAG is 17 GPa.

In order to reduce elastic modulus mismatch (thereby resulting in enhanced strain tolerance) where YAG-based ceramics are used, the elastic modulus of the ceramic is preferably less than or equal to about 250 GPA (the elastic modulus of zirconia). While the elastic modulus of YAG is 280 GPa, this is still within acceptable limits.

Density of the ceramic is important for weight considerations, especially on rotating components. Accordingly, the density of a suitable YAG-based ceramic is preferably equal to or less than that of zirconia, which is 6.4 $gcm^{-3}$. The density of YAG is 4.6 $gcm^{-3}$.

Finally, preferred ceramics should be inert with respect to commonly-used industrial solvents, such as acetone, methanol and the like, as well as the typical gas-turbine engine environmental conditions, including gases, water vapor, alkali, and other salts, commonly at high temperatures. YAG-based ceramics are considered to be robust high-temperature structural ceramics.

The YAG-based ceramics in accordance with the present invention have finite melting points, and therefore may be processed using techniques known to those of skill in the art, for example plasma spraying or physical methods such as electron beam physical vapor deposition (EBPVD) or magnetron sputtering. Plasma spraying particular is suitable for the production of coatings with non-percolating networks of microstructural defects. These defects scatter phonons and photons, thereby substantially reducing the effective thermal conductivity of the coating by up to a factor of four relative to dense, polycrystalline material as shown in FIGS. 3A–D. These defects also significantly reduce the effective Young's modulus of the coating, and impart improved thermal expansion strain tolerance to TBCs. EBPVD also produces coatings with defect-containing microstructures, although it has been less extensively used than plasma spray coating.

The ceramic coating is preferably compatible with a bond coat alloy. Bond coat alloys are known to those of skill in the art, for example; NiCoCrAlY, NiCoCrAlY+Si+Hf, PtAl, and the like. YAG is known to be chemically stable when in contact with alumina at temperatures as high as 1650° C.

Figure 1B:
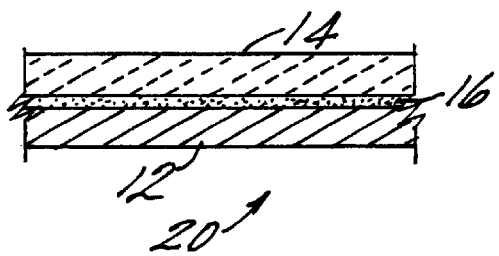

Referring to FIG. 1, one embodiment of a ceramic-metal composite in accordance with the present invention is shown at 10, wherein the composite comprises a superalloy substrate 12 bonded to thermal barrier coating 14. The ceramic thermal barrier coating 14 in accordance with the present invention may be used to protect superalloy substrates known to those of skill in the art, including but not being limited to, nickel-based superalloy substrates, steels, and the like. A second embodiment of the present invention is shown at 20, wherein the composite comprises a superalloy substrate 12, bonded to thermal barrier coating 14 by bond coat alloy 16.

Other applications of the ceramic YAG-based ceramics in accordance with the present invention, include bulk load-bearing thermal insulators. The invention is further illustrated by the experiments described below.

Experimental Procedure: Dense (98–99% of the theoretical limits), polycrystalline garnets of nominal chemical composition $Y_3Al_xFe_{(5-x)}O_{12}$ where x=0.0, 0.7, and 1.4 was obtained from TransTech, Inc., Adamstown, Md., U.S.A. (supplied as-sintered). Where x=5.0, a sample was obtained from Dr. J. D. French (supplied as-hot-pressed). The grain size of the garnets was in the range from about 2 to 20 μm. For each of the four compositions, a set of specimens was machined, each set comprising a plate specimen (12.7× 12.7×12.7 mm) and disk specimen (5.8 mm diameter×1.52 mm thick).

Thermal diffusivity (k) of each of the four plate specimens was measured using a laser flash technique, and specific heat (c) of each of the four disk specimens was measured by differential scanning calorimetry (single-crystal alumina reference material), both in the temperature range from 23 to 1000° C. as described by K. D. Maglic, A. Cezairliyan and V. E. Peletsky in *Compendium of Thermophysical Property Measurement Methods,* Vol. 2, Plenum Press, New York, New York, U.S.A. (1992). Due to the translucency of the specimens to the laser, the front and back faces of the specimens were coated with a thin layer of silicone carbide and carbon respectively prior to measurement. Although the carbon coating had no effect on the measurements, appropriate corrections were made in the thermal diffusivity calculations to account for the presence of the silicone carbide layer. Thermal property measurements were performed at the Thermophysical Properties Research Laboratories, Inc., West Lafayette, Ind., U.S.A. At a given temperature (T), the thermal conductivity (k) was determined using the relationship k=c, where=is the density of the sample. Linear thermal expansivity (approx. $9 \times 10^{-6}$ °C.$^{-1}$) was used to account for the changes in the specimen geometry with temperature. The thermal conductivity values are accurate within 5%. Some measurements were also performed during cooling. The difference between the respective heating and cooling values was found to be within experimental error.

Results and Analysis: The thermal conductivity of the four garnet specimens is plotted in FIGS. 3 and 4 as a function of temperature and composition respectively. The high-temperature thermal conductivity of garnets is significantly lower than that of most currently available polycrystalline ceramics.

As shown in FIGS. 3A and 3B, thermal conductivity for the pure garnets YAG (3A) and YIG (3B) decreases with increasing temperature. Without being bound by theory, such result is expected from the theory of thermal conduction by phonons (lattice waves), where the thermal conductivity is limited by intrinsic phon scattering scales as 1/T. Preliminary analysis, however, suggest that at higher temperatures (greater than approximately 400° C.), the 1/T model underestimates the observed thermal conductivity, by as much as 1.5 Wm$^{-1}$K$^{-1}$ at 1000° C. This is because the contribution of photon thermal conductivity (internal radiation) becomes increasingly important at higher temperatures, especially for translucent ceramics such as YAG and YIG. Optical lattice modes can also contribute to the overall thermal conductivity at higher temperatures. As shown in FIGS. 3C and 3D, substitutional solute atoms introduce additional photon scattering effects, discussed in further detail below.

Figure 4:
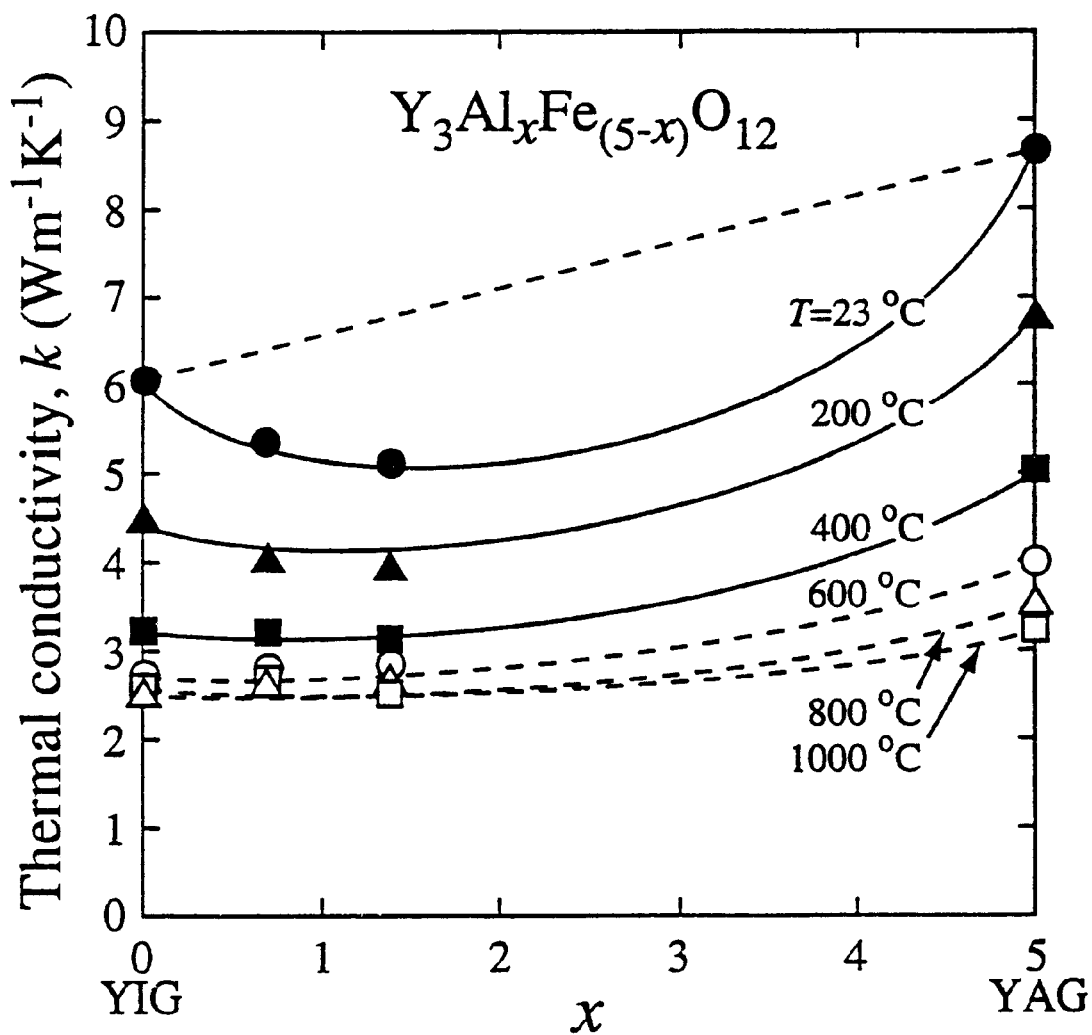
FIG. 4 is a plot showing the effect of composition for $Y_3Al_xFe_{(5-x)}O_{12}$ garnets at different temperatures, wherein Equation (1) is represented by solid curves for T=23° C., 200° C., and 400° C.; and by dashed curves for T=600° C., 800° C., and 1000° C. The upper dashed line represents rule-of-mixtures (Equation 2) at T=23° C.

Thermal conductivity as a function of x in $Y_3Al_xFe_{(5-x)}O_{12}$ solid solutions is plotted in FIG. 4 for six different temperatures. Alloying has a marked effect on the thermal conductivity at near-room temperature, as evidenced by the significant depression of the thermal conductivity data below the rule-of-mixture line (dashed). Again, without being bound by theory, this is because substitutional solute atoms scatter phonons as a result of differences in atomic masses, differences in atomic binding forces, and lattice distortion introduced by the presence of the solute atoms. However, the effect of alloying on the thermal conductivity diminishes at higher temperatures. At higher temperatures, solute-atom scattering, which is independent of temperature, becomes less important relative to intrinsic phonon scattering, which scales as T.

The above-described data may be used as a guide in predicting the thermal conductivities of intermediate compositions of interest. The effect of scattering by solute atoms on the phonon thermal conductivity may be written as follows:

$$k = k^i (\omega_O/\omega_M) \tan^{-1}(\omega_M/\omega_O) \quad (1a)$$

wherein $$(\omega_O/\omega_M)^2 = \chi T / \{C(1-C)\} \quad (1b)$$

and further wherein $\omega_M$ is the phonon frequency corresponding to the maximum of the acoustic branch of the phonon spectrum, $\omega_O$ is the phonon frequency where the intrinsic mean free path is equal to that due to solute atoms, $\chi$ is a constant, and C is the concentration of the solute atoms. $k_i$ is the solid-solution thermal conductivity without the solute-atom phonon scattering (rule-of-mixtures), and is represented by:

$$k_i = Ck_A + (1-C)k_B \quad (2)$$

where $k_A$ and $k_B$ are thermal conductivities of solids with end compositions C=0 and C=1, respectively, at a given temperature.

The effect of a solute atom concentration C, where C=0.2x on the thermal conductivity of $Y_3Al_xFe_{(5-x)}O_{12}$ may be determined by first calculating $k_i$ using Equation (2) at temperatures for which experimental data for YAG and YIG are available. Next, using Equation (1a), $\omega_O/\omega_M$ ratios for mixed compositions for which thermal conductivity date are available (x=0.7 and 1.4) are calculated. Only those thermal conductivity data collected at T<400° C. are used to compute $\omega_O/\omega_M$ ratios. Third, for each C and T ($\leq$500° C.), Equation (1b) is used to calculate $\chi$, in this case giving an average value of $\chi=5.45 \times 10^{-4}$K$^{-1}$. Finally, Equations 1a and 1b are used to construct a plot of the thermal conductivity as a function of $\chi$ for T<400° C., as shown by the dashed line in FIG. 4. The experimental and theoretical data are also in good agreement even where T>400° C., despite the additional high temperature effects of photon and optical mode thermal conduction effects not having been explicitly considered in deriving Equation (1). Again without being bound by theory, this may be due to the additional photon and optical-mode effects being accounted for in $k_i$, and/or the solute atoms having little or no effect on the thermal conductivity contribution from photons and optical-modes.

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. A ceramic-metal composite material suitable for use in a high temperature environment comprising:

a metal substrate having disposed thereon an optional metallic bond coat; and a YAG-based ceramic thermal barrier coating disposed on the metal substrate or on the optional metallic bond coat, wherein the YAG-based ceramic thermal barrier coating is selected from the group consisting of $Y_3{}^CAl_2{}^AAl_3{}^DO_{12}$, wherein C, A, and D are sites on the crystal structure, and further wherein all or part of the $Al^{3+}$ on the A sites, D sites, or A and D sites are substituted in an amount effective to provide the YAG-based ceramic thermal barrier coating with a thermal conductivity less than or equal to about 3 Wm$^{-1}$K$^{-1}$ at about 1000° C., an oxygen diffusivity less than or equal to about $10^{-15}$ m$^2$s$^{-1}$ at about 1000° C., a thermal coefficient of expansion greater than or equal to about $9 \times 10^{-6}$ °C.$^{-1}$, a maximum temperature capability greater than or equal to about 1400° C., a hardness greater than or equal to about 14 GPa, an elastic modulus less than or equal to about 280 GPa, or a density less than or equal to about 6.4 gcm$^{-3}$.

2. The ceramic-metal composite material of claim 1, wherein all or part of the Al$^{3+}$ on the A sites, D sites, or A and D sites are substituted by an element selected from the group consisting of transition elements and mixtures thereof.

3. The ceramic-metal composite material of claim 2, wherein all or part of the Al$^{3+}$ on the A sites, D sites, or A and D sites are substituted by an element selected from the group consisting of iron, gallium, scandium, and mixtures thereof.

4. The ceramic-metal composite material of claim 1, wherein all or part of the Y$^{3-}$ on the C site is substituted by an element selected from the group consisting of rare earth elements and mixtures thereof.

5. The ceramic-metal composite material of claim 2, wherein all or part of the Y$^{3+}$ on the C site is substituted by an element selected from the group consisting of cerium, neodymium, terbium, ytterbium, and mixtures thereof.

6. The ceramic-metal composite material of claim 2, wherein the metallic bond coat is omitted and the YAG-based ceramic thermal barrier coating is disposed directly upon the metal substrate.

7. A turbine engine component having a thermal barrier coating comprising:

a turbine engine component having disposed thereon an optional metallic bond coat; and a thermal barrier coating disposed on the optional metallic bond coat or on the turbine engine component, wherein the thermal barrier coating comprises a YAG-based ceramic selected from the group consisting of Y$_3^C$Al$_2^A$Al$_3^D$O$_{12}$, wherein C, A, and D are sites on the crystal structure, and further wherein all or part of the Al$^{3+}$ on the A sites, D sites, or A and D sites are substituted in an amount effective to provide the YAG-based ceramic thermal barrier coating with a thermal conductivity less than or equal to about 3 Wm$^{-1}$K$^{-1}$ at about 1000° C., an oxygen diffusivity less than or equal to about 10$^{-15}$ m$^2$s$^{-1}$ at about 1100° C., a thermal coefficient of expansion greater than or equal to about $9 \times 10^{-6}$ °C.$^{-1}$, a maximum temperature capability greater than or equal to about 1400° C., a hardness greater than or equal to about 14 GPa, an elastic modulus less than or equal to about 280 GPa, or a density less than or equal to about 6.4 gcm$^{-3}$.

8. The turbine engine component of claim 7, wherein all or part of the aluminum Al$^{3+}$ on the A and/or D sites are substituted by an element selected from the group consisting of transition elements and mixtures thereof.

9. The turbine engine component of claim 8, wherein all or part of the aluminum Al$^{3+}$ on the A sites, D sites or A and D sites are substituted by an element selected from the group consisting of iron, gallium or scandium and mixtures thereof.

10. The turbine engine component of claim 7 wherein, all or part of the Y$^{3+}$ on the C site is substituted by an element selected from the group consisting of rare earth elements and mixtures thereof.

11. The turbine engine component of claim 10 wherein, wherein all or part of the aluminum Al$^{3+}$ on the A and/or D sites are substituted by an element selected from the group consisting of cerium, neodymium, erbium, ytterbium, and mixtures thereof.

12. The turbine engine component of claim 7, further comprising a metallic bond coat disposed between the YAG-based ceramic thermal barrier and the turbine engine component.

13. The turbine engine component of claim 7, wherein the turbine engine component is a blade or a vane.

* * * * *

UNITED STATES PATENT AND TRADEMARK OFFICE
CERTIFICATE OF CORRECTION

PATENT NO.    : 6,015,630                                                     Page 1 of 1
DATED         : January 18, 2000
INVENTOR(S)   : Nitin P. Padture et al.

It is certified that error appears in the above-identified patent and that said Letters Patent is hereby corrected as shown below:

Column 4,
Line 51, after "thereof" insert -- . --

Column 8,
Line 67, after "about" (second occurrence), delete "1000º" and insert therefor
-- 1100º --

Column 9,
Line 16, after "the", delete "$Y^{3-}$" and insert therefor -- $Y^{3+}$ --

Signed and Sealed this

Eleventh Day of November, 2003

JAMES E. ROGAN
*Director of the United States Patent and Trademark Office*